US 11,840,163 B2

(12) United States Patent  
Kuroda

(10) Patent No.: US 11,840,163 B2  
(45) Date of Patent: Dec. 12, 2023

(54) SEAT SLIDING DEVICE

(71) Applicant: TF-METAL Co., Ltd., Shizuoka (JP)

(72) Inventor: Shunsuke Kuroda, Shizuoka (JP)

(73) Assignee: TF-METAL CO., LTD., Shizuoka (JP)

( * ) Notice: Subject to any disclaimer, the term of this patent is extended or adjusted under 35 U.S.C. 154(b) by 0 days.

(21) Appl. No.: 17/872,252

(22) Filed: Jul. 25, 2022

(65) Prior Publication Data

US 2023/0023091 A1  Jan. 26, 2023

(30) Foreign Application Priority Data

Jul. 26, 2021 (JP) .................................. 2021-121255

(51) Int. Cl.
*B60N 2/08* (2006.01)
*B60N 2/07* (2006.01)

(52) U.S. Cl.
CPC ......... *B60N 2/0875* (2013.01); *B60N 2/0705* (2013.01)

(58) Field of Classification Search
CPC ...... B60N 2/0875; B60N 2/0705; B60N 2/08; B60N 2/0818; B60N 2/705; B60N 2/085
USPC ....................................................... 248/429
See application file for complete search history.

(56) References Cited

U.S. PATENT DOCUMENTS

| 6,086,154 A | * | 7/2000 | Mathey | B60N 2/0705 |
| | | | | 297/341 |
| 8,936,227 B2 | * | 1/2015 | Kawamura | B60N 2/0705 |
| | | | | 248/548 |
| 2011/0024595 A1 | * | 2/2011 | Oi | B60N 2/0825 |
| | | | | 248/429 |

FOREIGN PATENT DOCUMENTS

| JP | 2012-126184 A | 7/2012 |
| JP | 2018-52401 A | 4/2018 |

* cited by examiner

*Primary Examiner* — Nkeisha Smith
(74) *Attorney, Agent, or Firm* — Nath, Goldberg & Meyer; Jerald L. Meyer

(57) ABSTRACT

A front upper support surface and a rear upper support surface facing an upper surface of a rear end of an operation handle are provided in a lock release lever with a gap between the front upper support surface and the rear upper support surface in the vehicle front-rear direction, and front lower support surfaces are provided below the front upper support surface. An upper rail is provided with a rear lower support surface, which is positioned below a rear upper support surface. A clearance is provided between the front lower support surface and a lower surface of a rear end of the operation handle, and a clearance is provided between the rear lower support surface and the lower surface of the rear end of the operation handle.

5 Claims, 13 Drawing Sheets

SEAT SLIDING DEVICE

CROSS REFERENCE TO RELATED APPLICATION

This application is based upon and claims the benefit of priority under 35 U.S.C. § 119 from Japanese Patent Application No. 2021-121255 filed on Jul. 26, 2021, the entire contents of which are incorporated herein by reference.

TECHNICAL FIELD

The present disclosure relates to a seat sliding device used for a seat for a vehicle.

BACKGROUND

In a seat sliding device for a vehicle, an upper rail fixed to a seat is provided to be slidably movable on a lower rail fixed to a vehicle body, and lock teeth (lock portions) of a lock member attached to the upper rail engage with lock grooves (locked portions) in the lower rail to lock the seat. The seat sliding devices of Japanese Patent Application Publication Nos. 2012-126184 and 2018-052401 are provided with a lock release lever for operating lock portions in a lock release direction, and the lock release lever on the front side from the turning center is partially biased upward by means of a biasing member. In Japanese Patent Application Publication Nos. 2012-126184 and 2018-052401, the lock release lever is biased such that the rear end of the lock release lever comes into contact with the lock portions without a clearance (a gap, a space) therebetween.

In Japanese Patent Application Publication No. 2012-126184, the above biasing member is provided between an operation handle inserted into the front end of the lock release lever and the lock release lever. In addition, a rear-end connecting portion of the operation handle is supported so as to be swingable around an axis in the left-right direction different from the turning center of the lock release lever, and the operation handle is prevented from coming off in the axial direction with respect to the lock release lever.

Meanwhile, in Japanese Patent Application Publication No. 2018-052401, the above biasing member is provided on the upper rail.

SUMMARY

The biasing member of Japanese Patent Application Publication No. 2012-126184 always biases in a direction maintaining a lower supported portion in a supported state by means of a lower support portion, and an upper supported portion in a supported state by means of an upper support portion. Accordingly, when the operation handle operates in the lock release direction from the standby position, the lock release lever immediately starts to push the lock portions in the lock release direction. Although the operation stroke of the operation handle can be reduced, the time from the start of movement of the operation handle to the release of the lock is shortened, and thus an operator may feel that the lock is released earlier than the operator thinks.

Further, in Japanese Patent Application Publication Nos. 2012-126184 and 2018-052401, since the operation handle is a rigid body for connecting left and right seat sliding devices, the lock release lever can be turned in the lock release direction in the standby state due to a phase difference (deformation due to displacement of the mounting position, collision, etc.) of the left and right seat sliding devices in the up-down direction. Accordingly, a clearance is provided between the operation handle and the lock release lever in the anti-lock release direction (direction opposite to the lock release direction) from the standby position of the operation handle. Thus, even if the operation handle moves downward within the clearance range due to a load pushing the operation handle downward, the lock release lever is prevented from turning.

Accordingly, an object of the present invention is to make it possible to turn only the operation handle with respect to the lock release lever in both the lock release direction and the anti-lock release direction for the standby position of the operation handle in a non-operation state, with a simpler structure.

A seat sliding device according to the present invention includes: a lower rail extending in a vehicle front-rear direction; an upper rail configured to move relative to the lower rail in a longitudinal direction; a lock member attached to the upper rail, and including lock portions configured to engage with locked portions formed in the lower rail and to be biased in a lock direction; a lock release lever mutably supported about an axis in a left-right direction with respect to the upper rail, and configured to move the lock portions from a lock position to a lock release position in accordance with a lock release operation; an operation handle connected to a front end of the lock release lever; and a biasing member configured to bias the front end of the lock release lever in the lock release direction with a biasing force weaker than a biasing force biasing the lock portions in the lock direction. A front upper support surface and a rear upper support surface facing an upper surface of an end of the operation handle are provided at the front end of the lock release lever with a gap between the front upper support surface and the rear upper support surface in the vehicle front-rear direction, and front lower support surfaces facing a lower surface of an end of the operation handle are provided below the front upper support surface. The upper rail is provided with a rear lower support surface facing the lower surface of the end of the operation handle, and the rear lower support surface is positioned below the rear upper support surface. The biasing member has one end fixed to the upper rail, and the other end engaged with the lower surface of the end of the operation handle from below at a position between the front upper support surface and the rear upper support surface, and biases the operation handle upward. A clearance is provided in an up-down direction between the front lower support surface provided in the lock release lever and the lower surface of the end of the operation handle, and a clearance is provided in the up-down direction between the rear lower support surface provided in the upper rail and the lower surface of the end of the operation handle.

The present invention makes it possible to turn only the operation handle with respect to the lock release lever in both the lock release direction and the anti-lock release direction for the standby position of the operation handle in a non-operation state, with a simpler structure.

DETAILED DESCRIPTION

Embodiments of the present invention will be described below with reference to the drawings.

First Embodiment

Figure 1:
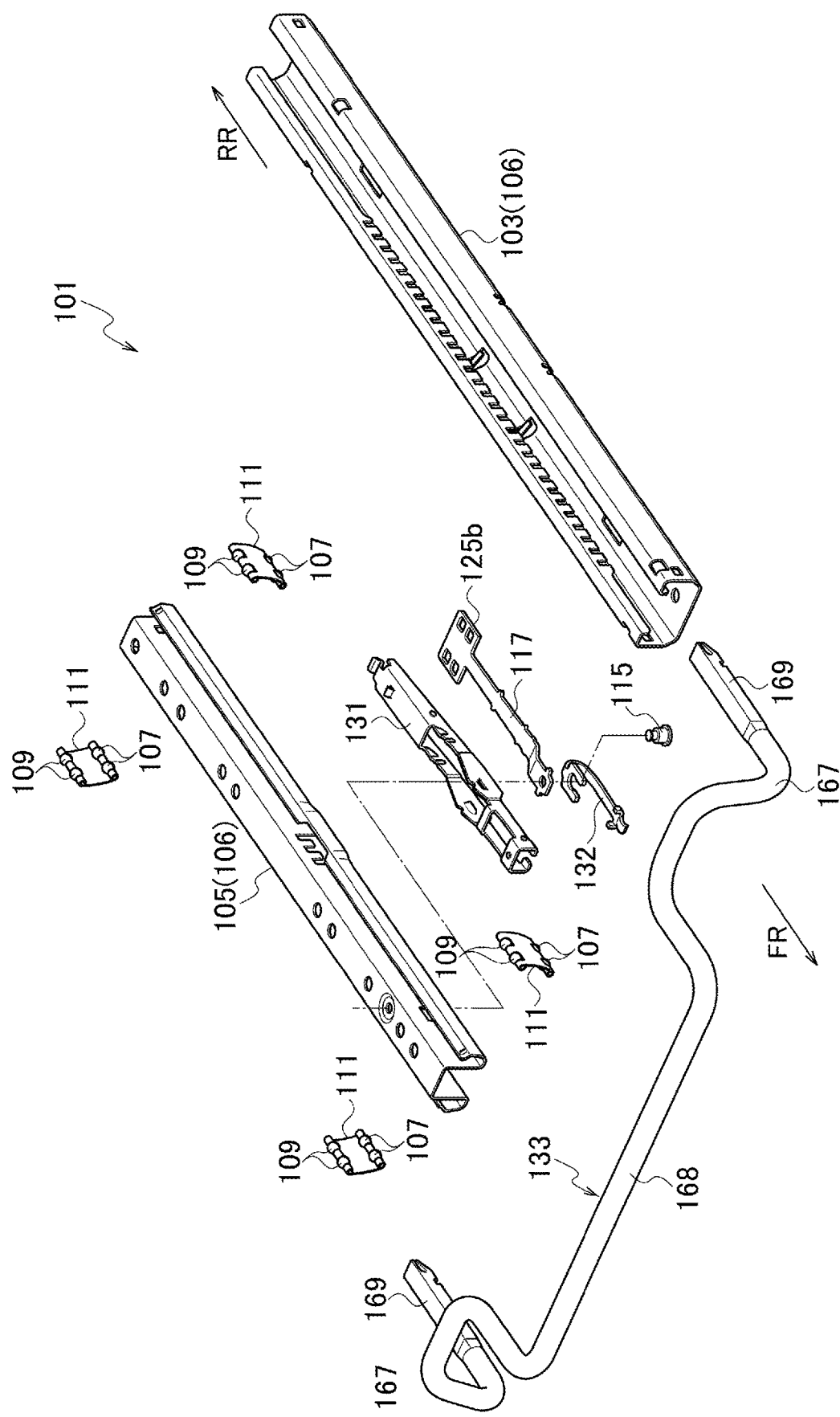
FIG. 1 is an exploded perspective view of a seat sliding device according to a first embodiment of the present invention.
Figure 2:
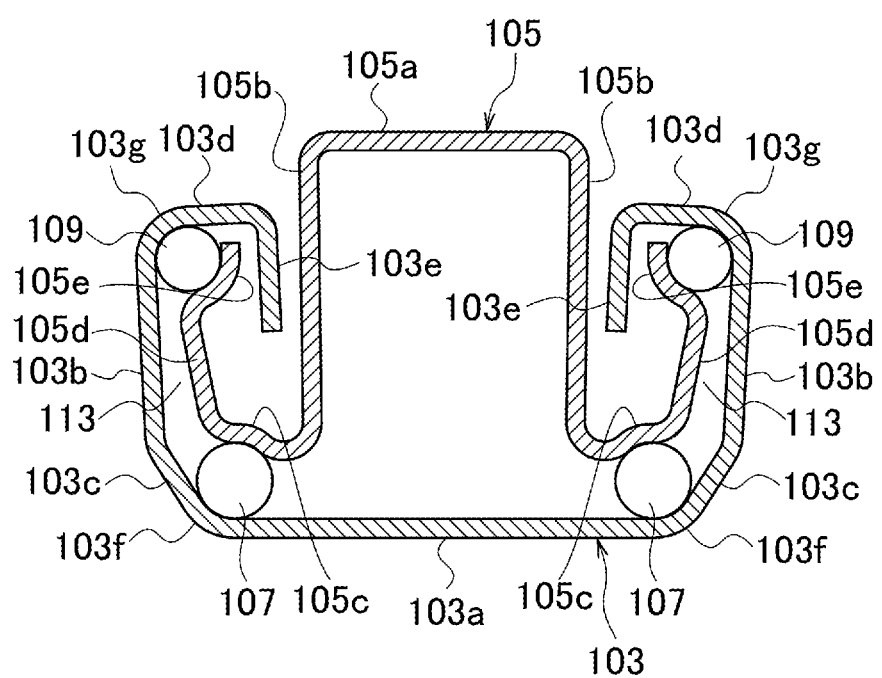
FIG. 2 is a cross-sectional view of a seat sliding device including a lower guide ball and an upper guide ball disposed between an upper rail and a lower rail.

A seat sliding device 101 according to a first embodiment of the present invention illustrated in FIGS. 1 and 2 is a manual seat sliding device in which the position of a vehicle seat in a front-rear direction is adjusted manually. The seat sliding device 101 includes: a lower rail 103 installed on a floor surface of a vehicle and extending in a vehicle front-rear direction; and an upper rail 105 installed on a back surface of a seating portion (not illustrated) of a seat and assembled to be movable within the lower rail 103 in a relative manner in a longitudinal direction of the lower rail 103. The lower rail 103 and the upper rail 105 form a rail body 106 and a pair of left and right rail bodies 106 are provided. Note that, in the following description (including the second and third embodiments), "front" is the vehicle front FR side which is the left side in FIG. 1, "rear" is the vehicle rear RR side which is the right side in FIG. 1, and "left-right" is the left-right direction when viewing the vehicle front side from the vehicle rear side.

As illustrated in FIG. 2, the lower rail 103 includes a lower bottom wall 103a having a rectangular plate shape extending in the vehicle front-rear direction. A pair of left and right lower outer walls 103b rise from both end edges of the lower bottom wall 103a in a vehicle width direction so as to tilt slightly outward from the lower bottom wall 103a. Lower tilted walls 103c are formed between the lower bottom wall 103a and lower ends of the respective left and right lower outer walls 103b. A pair of left and right lower upper walls 103d extending in parallel with the lower bottom wall 103a are provided from upper end edges of the respective left and right lower outer walls 103b in a direction approaching each other.

A pair of left and right lower inner walls 103e are provided to hang down from inner end edges of the respective left and right lower upper walls 103d toward the lower bottom wall 103a. Note that a clearance between the lower inner walls 103e disposed parallel to and facing each other is set large enough to allow movement of the upper rail 105 housed in the lower rail 103.

The upper rail 105 includes an upper top wall 105a having a rectangular plate shape extending in the vehicle front-rear direction. A pair of left and right upper side walls 105b hang down from both end edges of the upper top wall 105a in the vehicle width direction. Upper lower-tilted-walls 105c rise obliquely outward and upward from lower end edges of the respective upper side walls 105b. Upper upper-tilted-walls 105e rise obliquely upward toward the lower upper walls 103d from upper end edges of the respective left and right upper lower-tilted-walls 105c via bent portions 105d.

Lower guide balls 107 are rotatably disposed between lower arc portions 103f of the lower rail 103 and the upper lower-tilted-walls 105c of the upper rail 105, and the lower arc portions 103f are formed between the lower bottom wall 103a and the lower tilted walls 103c of the lower rail 103. Upper guide balls 109 are rotatably disposed between upper arc portions 103g of the lower rail 103 and the upper upper-tilted-walls 105e of the upper rail 105, and the upper arc portions 103g are formed between the lower outer walls 103b and the lower upper walls 103d of the lower rail 103.

As illustrated in FIG. 1, the lower guide balls 107 and the upper guide balls 109 are rotatably supported in ball retainers 111 omitted in FIG. 2. Each of the ball retainers 111 supports a total of four balls which are two lower guide balls 107 and two upper guide balls 109. The ball retainers 111 supporting the lower guide balls 107 and the upper guide balls 109 are disposed at two positions on the front and the rear sides in a housing portion 113 (FIG. 2) surrounded by the lower outer walls 103b, the lower tilted walls 103c, the lower upper walls 103d, and the lower inner walls 103e, and are disposed at a total of four positions in the pair of left and right rail bodies 106.

In a state where the rail bodies 106 are assembled, a lock member 117 is fixed to the upper top wall 105a in a front portion of the upper rail 105 by using a fixing member 115 such as a rivet or a fixed pin. The lock member 117 is formed of a plate-shaped spring member. The lock member 117 has a fixing hole 119a into which the fixing member 115 is inserted, in a fixing portion 119 which is a base fixed by using the fixing member 115. In the upper top wall 105a of the upper rail 105, a peripheral portion of an upper fixing hole 105f is formed to be recessed downward relative to the other portion of the upper top wall 105a. Thus, a head portion of the fixing member 115 is set not to protrude from the other upper surface of the upper top wall 105a of the upper rail 105.

Figure 7:
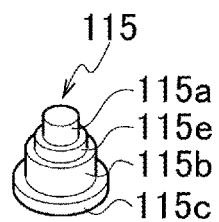
FIG. 7 is a perspective view of a fixing member.
Figure 11:
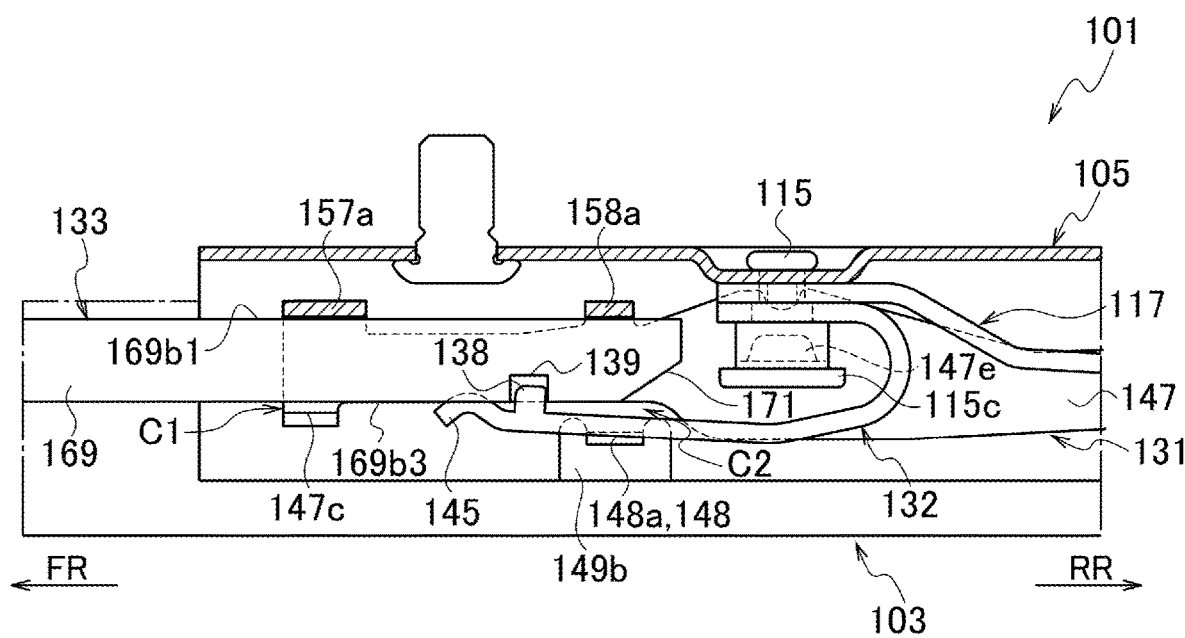
FIG. 11 is a side-sectional view of an enlarged main portion of the seat sliding device according to the first embodiment.

FIG. 7 illustrates the fixing member 115 before being attached. As illustrated in FIG. 11 which is a side-sectional view of an enlarged main portion, the fixing member 115 includes: an insertion shaft portion 115a inserted into the fixing hole 119a and the upper fixing hole 105f from below; a second insertion shaft portion 115e, which is formed under the insertion shaft portion 115a and has a diameter larger than that of the insertion shaft portion 115a, and is inserted into a biasing-member-side fixing hole 134a (which will be described later); a large-diameter portion 115b formed below the second insertion shaft portion 115e and having a larger diameter than the second insertion shaft portion 115e; and a flange 115c formed below the large-diameter portion 115b on the opposite side to the insertion shaft portion 115a. The flange 115c forms a protrusion protruding sideways.

Figure 8:
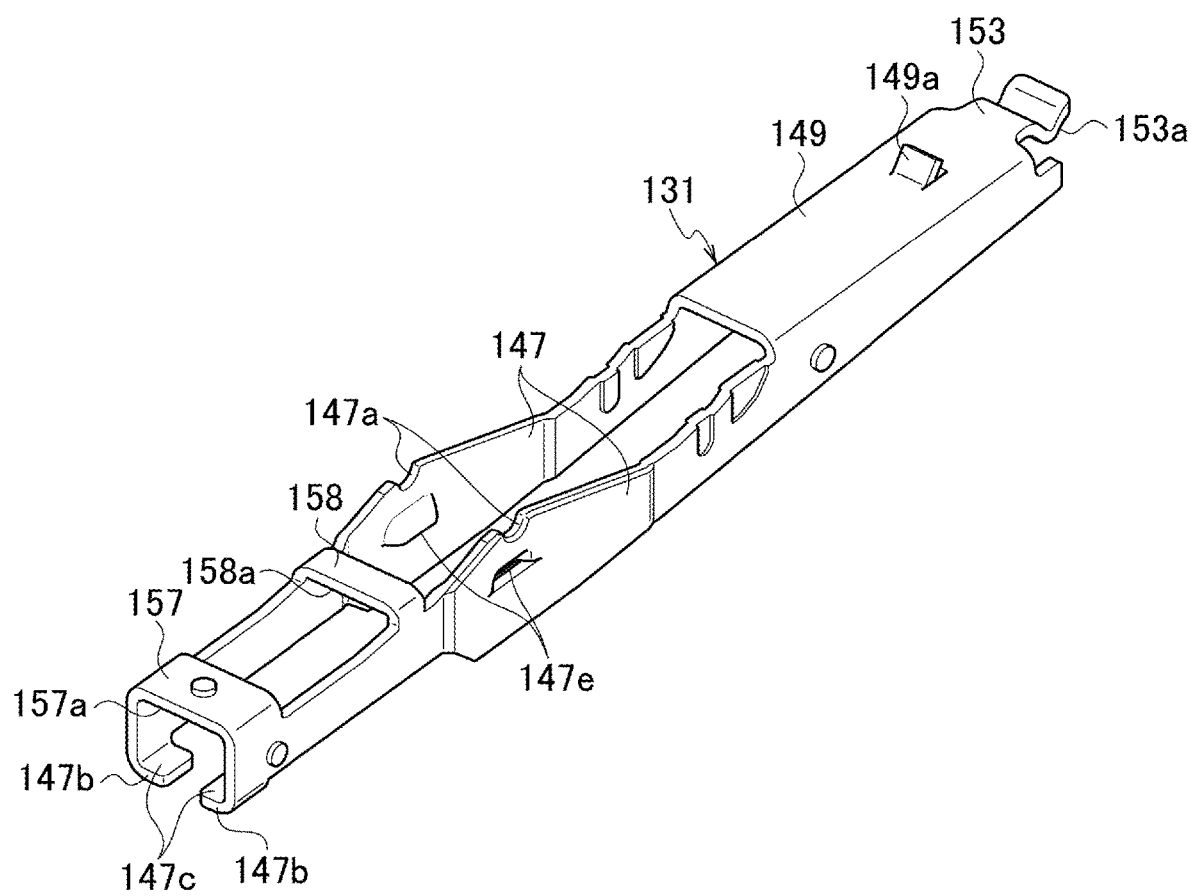
FIG. 8 is a perspective view of a lock release lever.

As illustrated in FIG. 11, the flange 115c is positioned below support protrusions 147e provided in left and right side walls 147 of a lock release lever 131 illustrated in FIG. 8 which will be described later. As illustrated in FIG. 8, the support protrusions 147e are positioned slightly forward from the center position of the lock release lever 131 in the front-rear direction, and are formed by cutting and raising the side walls 147, which are part of the lock release lever 131, toward the inner side.

The upper portions of the support protrusions 147e are continuous with the side walls 147, and the lower portions of the support protrusions 147e are cut off from the side walls 147. The cutoff lower end surfaces of the support protrusions 147e face an upper surface of the flange 115c. A gap is formed in the up-down direction between the lower end surfaces of the support protrusions 147e and the upper surface of the flange 115c. Providing the gap allows the lock release lever 131 to swing in the front-rear direction with a swing fulcrum portion 151 (see FIG. 10) acting as a fulcrum. Here, the swing fulcrum portion 151 is provided with the fixing member 115.

Figure 5:
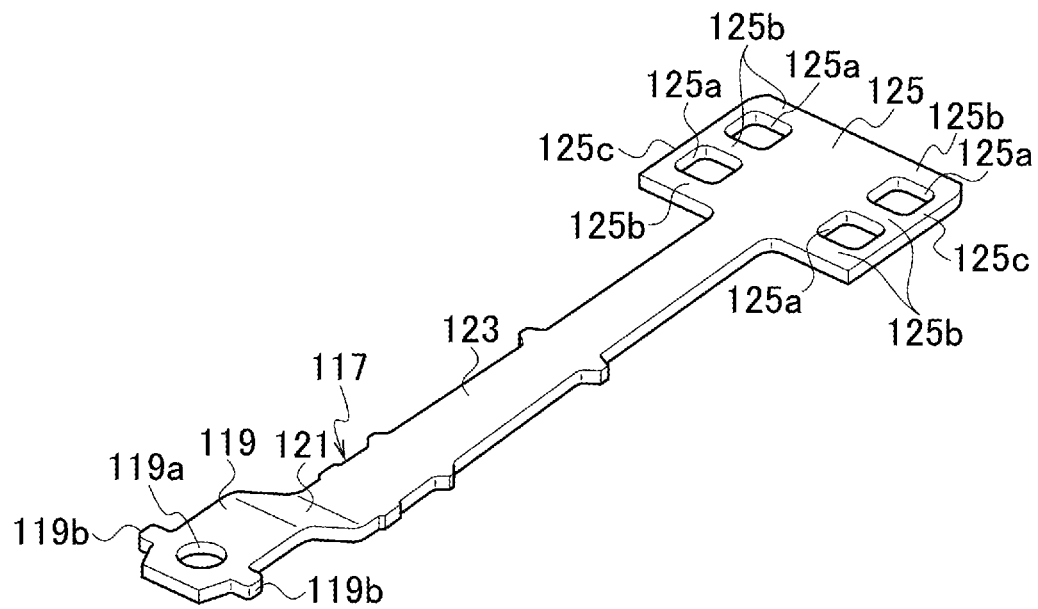
FIG. 5 is a perspective view of a lock member.

The fixing portion 119 of the lock member 117 illustrated in FIG. 5 extends in the front-rear direction substantially parallel to the upper top wall 105a illustrated in FIG. 1, and a rear tilted portion 121 is formed to be tilted rearward and obliquely downward from the rear end of the fixing portion 119. A rear elastic deformation portion 123 is formed to extend rearward from a rear end of the rear tilted portion 121 substantially parallel to the fixing portion 119. A rear end 125 of the rear elastic deformation portion 123 has a larger width in the left-right direction than the rear elastic deformation portion 123, and has a rectangular shape in a plan view. The rear elastic deformation portion 123 forms a rear biasing portion.

Two rectangular holes 125a are formed near each of the left and right edges of the rear end 125 in the front-rear direction. Portions of the rear end 125 adjacent to the respective holes 125a in the front-rear direction form lock teeth 125b, which are lock portions, protruding leftward and rightward. The lock teeth 125b are formed at three positions on each of the left and right sides. Distal ends of the lock teeth 125b formed at the three positions on each of the left and right sides are configured to be connected to one another by respective connecting portions 125c extending in the front-rear direction.

Figure 4:
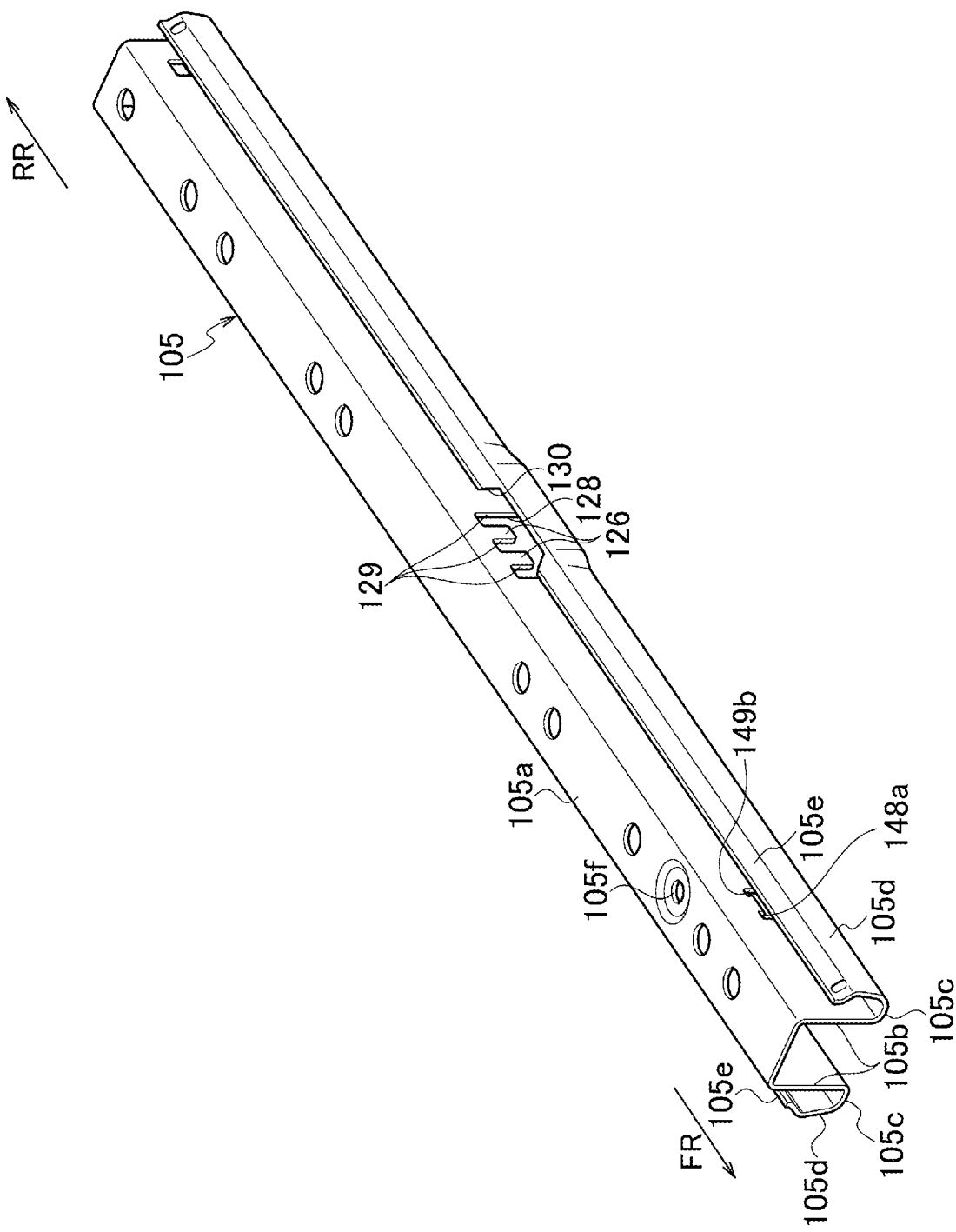
FIG. 4 is a perspective view of the upper rail.

As illustrated in FIG. 4, lock tooth receiving recesses 129 are formed near a substantially-center portion of the upper rail 105 in the front-rear direction so as to extend from the left and right upper side walls 105b to the left and right upper lower-tilted-walls 105c, and are formed at three positions on each of the left and right sides in the front-rear direction. In a state where the rail bodies 106 are assembled, the respective three lock teeth 125b of the lock member 117 are inserted into the three lock tooth receiving recesses 129 from below. At this time, protrusions 126 positioned between the lock tooth receiving recesses 129 are inserted into the holes 125a of the lock member 117. In this case, in order to avoid interference between the upper rail 105 and portions around the connecting portions 125c of the rear end 125, an opening 128 continuous with lower portions of the lock tooth receiving recesses 129 and a notch opening 130 formed in the upper upper-tilted-wall 105e are provided on each of the left and right sides of the upper rail 105.

Figure 3:
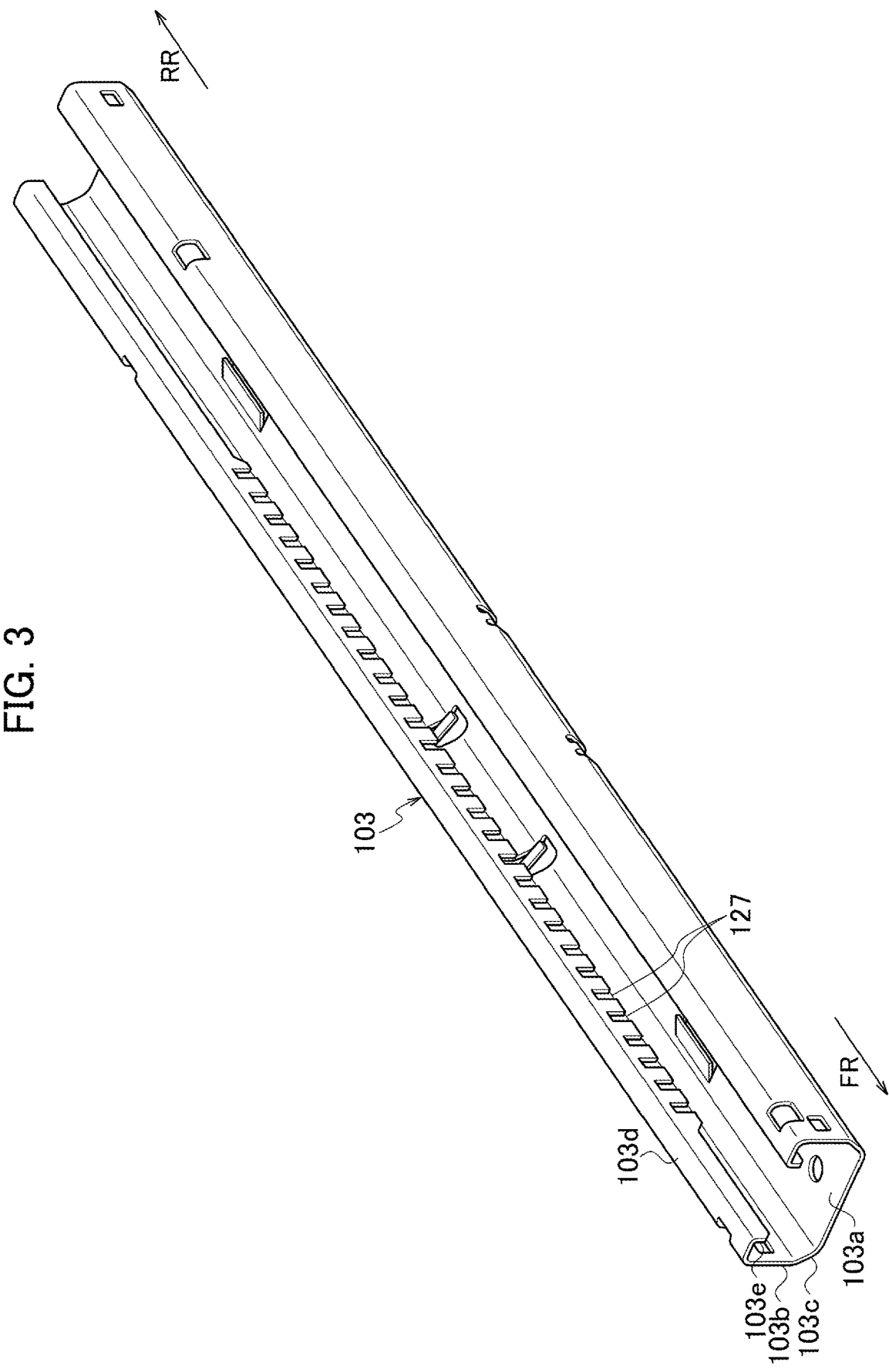
FIG. 3 is a perspective view of the lower rail.

Further as illustrated in FIG. 3, a plurality of lock grooves 127, which are locked portions, are provided in the lower rail 103 in the front-rear direction except for positions near front portions and rear portions of the left and right lower inner walls 103e. The lock member 117 is set to be locked to the lower rail 103 by inserting the lock teeth 125b of the lock member 117 into the lock grooves 127 from below with the lock teeth 125b positioned in the lock tooth receiving recesses 129. This makes it possible to prevent the upper rail 105 to which the lock member 117 is attached from moving relative to the lower rail 103 in the front-rear direction.

The rear elastic deformation portion 123 generates an elastic force upward in the state where the lock member 117 is attached to the upper rail 105, and thus, it is possible to maintain the state where the lock teeth 125b are inserted in the lock grooves 127. Operating an operation handle 133 illustrated in FIG. 1 in the lock release direction (upward) in this state causes the rear end 125 of the lock member 117 to be pushed downward via the lock release lever 131, and the lock is thereby released. The operation handle 133 is inserted into the upper rail 105 from the front side, and is disposed so as to be interlocked with the lock release lever 131.

As illustrated in FIG. 5, the lock member 117 includes bearing protrusions 119b, which are supported portions, protruding sideways from left and right portions of the fixing portion 119 at positions corresponding to the fixing hole 119a. The bearing protrusions 119b protrude sideways with the same thickness as the plate thickness of the lock member 117 including the fixing portion 119, and have a rectangular shape in a plan view.

As illustrated in FIG. 11, a biasing member 132 is fixed to the lower surface of the upper top wall 105a of the upper rail 105 by a fixing member 115 together with a plate spring forming the lock member 117. In the biasing member 132, a base 134 is fixed to the lower surface of the upper top wall 105a, a folded portion 135 of an intermediate portion extends rearward from the base 134 and is folded forward in the middle, and a distal end 136 extends forward by passing below the fixing member 115 to form a substantially U-shape. The biasing member 132 is formed of a plate-like spring member like the lock member 117.

Figure 6:
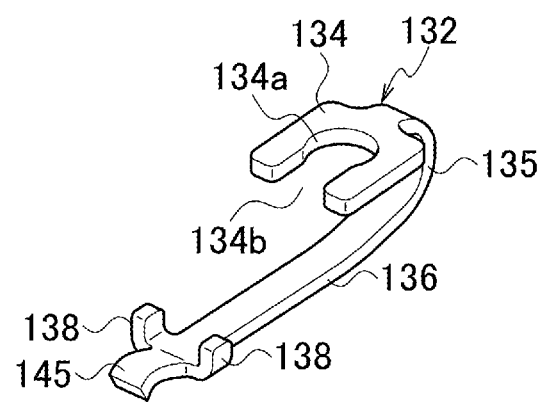
FIG. 6 is a perspective view of a biasing member.

As illustrated in FIG. 6, the base 134 of the biasing member 132 is provided with a fixing hole (biasing-member-side fixing hole) 134a into Which the second insertion shaft portion 115e of the fixing member 115 is inserted. The base 134 of the biasing member 132 is provided with a notch opening 134b continuous with the vehicle front side of the biasing-member-side fixing hole 134a through which the insertion shaft portion 115a of the fixing member 115 can pass. The distal end 136 of the biasing member 132 extends forward from the distal end (lower end) of the folded portion 135 substantially in parallel with the base 134. The distal end 136 of the biasing member 132 forms a front biasing portion.

A pressing protrusion 145, which is bent upward so as to protrude, is formed in the distal end (lower end) of the biasing member 132. As illustrated in FIG. 11, the pressing protrusion 145 enters from below and engages with a recessed groove 137, which is illustrated in FIG. 9B, provided on a lower surface 169b3 of the rear end of the operation handle 133. The distal end 136 of the biasing member 132 presses the operation handle 133 upward via the pressing protrusion 145. The pressing force of the biasing member 132 against the operation handle 133 is set weaker than the pressing force against the lock grooves 127 by means of the lock teeth 125b of the rear elastic deformation portion 123.

Further, the distal end 136 of the biasing member 132 is provided with a pair of left and right lock protrusions 138 at positions rearward of the pressing protrusion 145. A slit 139 is provided in the lower surface of the rear end of the operation handle 133 illustrated in FIGS. 9A and 9B, and the lock protrusions 138 are engaged with the slit 139 as illustrated in FIG. 11. The lock protrusions 138 are formed so as to protrude upward of the pressing protrusion 145 for pressing the lower surface of the rear end of the operation handle 133.

As illustrated in FIG. 8, the lock release lever 131 includes the left and right side walls 147, and an upper wall 149 connecting upper ends of the side walls 147 in a region around rear ends of the left and right side walls 147. The lock member 117 except for a portion around the rear portion is disposed between the left and right side walls 147 of the lock release lever 131. The biasing member 132 is disposed between the left and right side walls 147 of the lock release lever 131. That is, the lock release lever 131 is provided at a position overlapping the lock member 117 and the biasing member 132 in the longitudinal direction and the up-down direction of the upper rail 105.

Recesses 147a, which are supporting portions, are formed at upper ends of the side walls 147 on the front side of the intermediate position of the lock release lever 131 in the front-rear direction. The recesses 147a are positioned above the support protrusions 147e, and have an arc-shaped recess surface which is open at the upper portion. The recesses 147a are disposed below the left and right protrusions 119b of the lock member 117, and lower portions of the protrusions 119b engage with the recesses 147a. The protrusions 119b of the lock member 117, and the recesses 147a of the release lever 131 form the swing fulcrum portion 151 in a case where the lock release lever 131 and the operation handle 133 integrally swing in the up-down direction. The swing fulcrum portion 151 positionally matches the fixing portion of the lock member 117 with respect to the upper rail 105 in the front-rear direction.

The lock release lever 131 includes a release pressing portion 153 extending rearward from the upper wall 149. A curved protrusion 153a protruding to curve downward is formed in a lower portion of the release pressing portion 153 on the rear end side. The curved protrusion 153a comes into contact with an upper surface of the rear end 125 of the rear elastic deformation portion 123 in the lock member 117. A stopper protrusion 149a is formed on the upper wall 149 by cutting and raising a part of the upper wall 149 upward. The stopper protrusion 149a functions as a stopper which comes into contact with the upper top wall 105a of the upper rail 105 when the lock release lever 131 and the operation handle 133 swing and turn counterclockwise in FIG. 11 with the swing fulcrum portion 151 acting as a fulcrum.

The upper ends of the front ends of the lock release lever 131 are connected to each other by a front upper wall 157. The lower surface of the front upper wall 157 forms a front upper support surface 157a. Front lower protrusions 147b are formed at the front end lower portions of the left and right side walls 147, and protrude from the both side walls 147 so as to be bent toward the sides facing each other. The distal ends of the left and right front lower protrusions 147b are separated from each other, and a gap is formed therebetween. The upper surfaces of the front lower protrusions 147b from front lower support surfaces 147c.

A rear upper wall 158 is formed in the upper portions of the both side walls 147, which are positioned rearward of the front upper wall 157 and forward of the recesses 147a. The lower surface of the rear upper wall 158 forms a rear upper support surface 158a. That is, a pair of upper support surfaces (front upper support surface 157a and rear upper support surface 158a) facing an upper surface 169b1 of the rear end of the operation handle 133 are provided at the front end of the lock release lever 131. Here, the pair of upper support surfaces are provided with a gap between the pair of upper support surfaces in the vehicle front-rear direction. Further, the front lower support surfaces 147c facing the lower surface 169b3 of the rear end of the operation handle 133 are provided below the front upper support surface 157a in the front end of the lock release lever 131.

As illustrated in FIG. 1, the operation handle 133 includes a pair of left and right arms 167 provided respectively for the pair of left and right rail bodies 106, and a grip 168 extending in the vehicle width direction to connect the pair of left and right arms 167 to each other. The pair of left and right arms 167 extend in the front-rear direction and are inserted respectively into the left and right upper rails 105 from the front ends. The grip 168 is gripped by an occupant when the occupant operates the operation handle 133.

Figure 10:
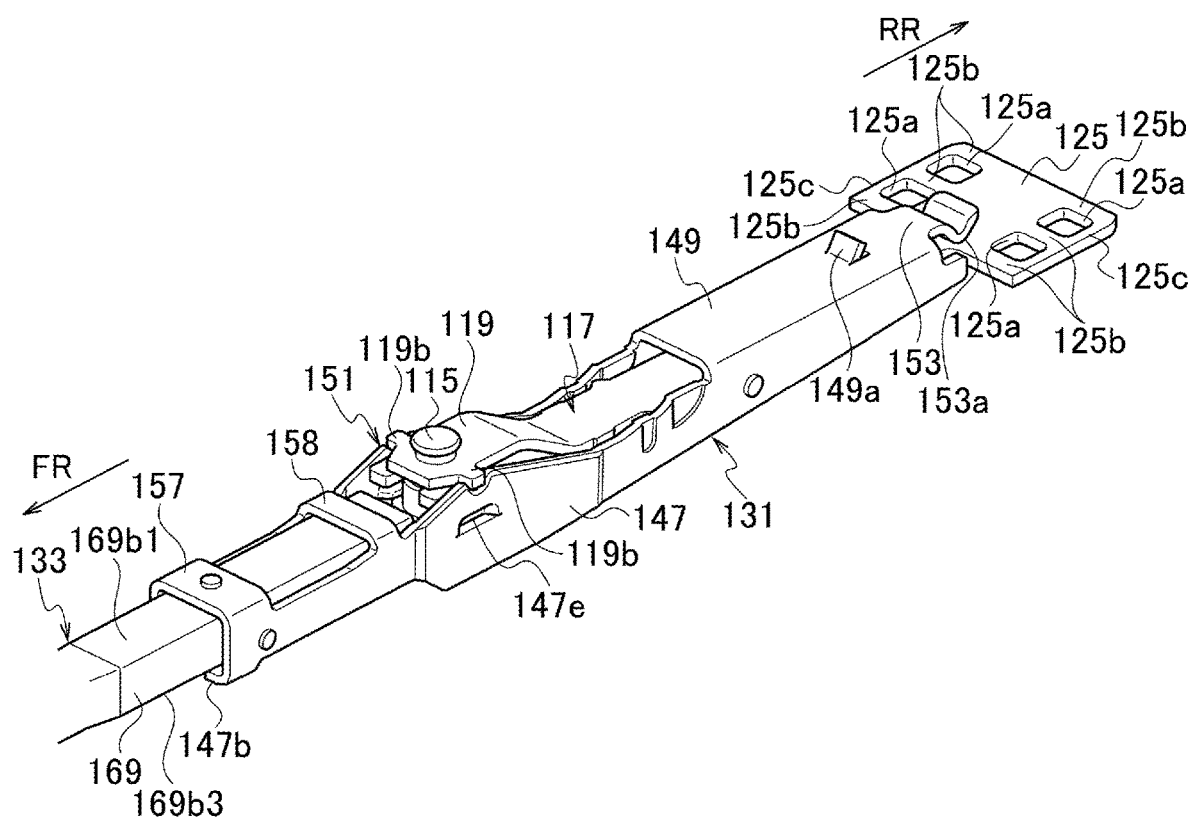
FIG. 10 is a perspective view illustrating a state in which the lock member is assembled to the lock release lever, and the operation handle.

As illustrated in FIG. 10, a rear end of the arm 167 is inserted between the left and right side walls 147 of the lock release lever 131. The arm 167 is formed of a cylindrical member as a whole including the grip 168, and the rear end of the arm 167 described above is a connection end 169 serving as a rear connecting portion formed by press molding of the cylindrical member.

Figure 9A:
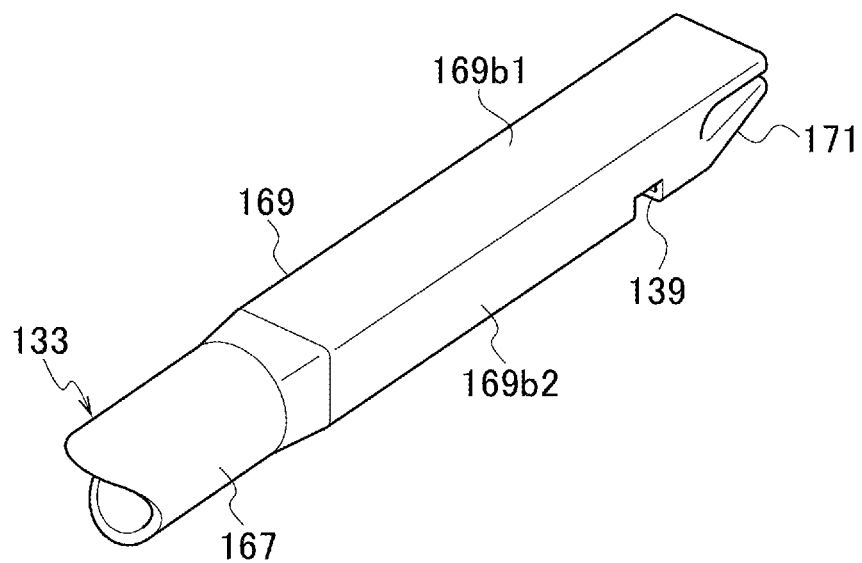
FIG. 9A is a perspective view illustrating a portion of an operation handle.
Figure 9B:
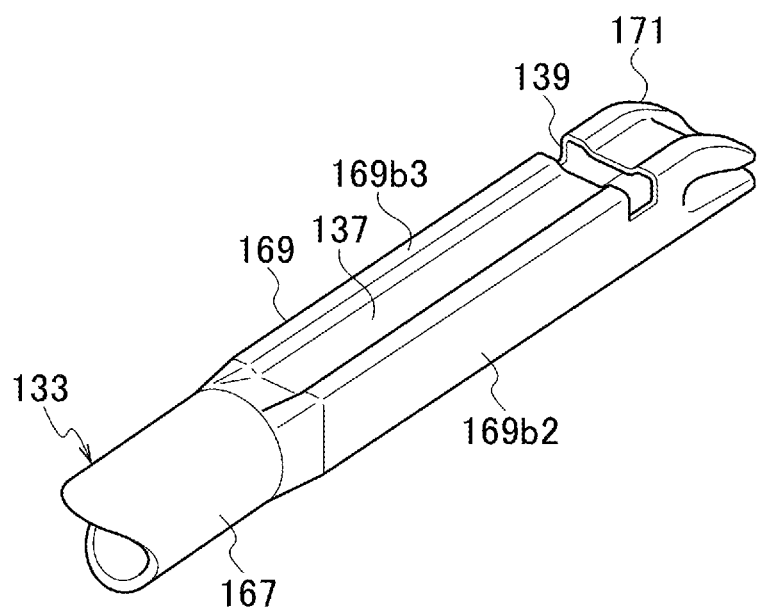
FIG. 9B is a perspective view of a portion of the operation handle as viewed from below.

As illustrated in FIGS. 9A and 9B, the connection end 169 has a substantially rectangular cross section including: the upper surface 169b1; side surfaces 169b2 extending downward from both left and right ends of the upper surface 169b1; and a lower surface 169b3 provided from the lower ends of the left and right side surfaces 169b2 toward the left and right inner sides. The recessed groove 137 extending in the vehicle front-rear direction is provided in the lower surface 169b3 of the connection end 169. In addition, the slit 139 described above, and a lower tapered surface 171 which is provided at the rear end of the connection end 169 and is inclined upward are formed on the lower surface 169b3 of the connection end 169.

As illustrated in FIG. 11, rear lower protrusions 148 are respectively formed on the left and right upper side walls 105b of the upper rail 105, and the rear lower protrusions 148 are formed at a front position of the upper fixing hole 105f in the vehicle front-rear direction, and protrude from the both upper side walls 105b so as to be bent toward the sides facing each other. A substantially U-shaped slit 149b is formed around the rear lower protrusion 148. The distal ends of the left and right rear lower protrusions 148 are separated from each other, and a gap is formed therebetween. The upper surfaces of the rear lower protrusions 148 form a rear lower support surface 148a. That is, the upper rail 105 is provided with the rear lower support surface 148a facing the lower surface 169b3 of the rear end of the operation handle 133, and the rear lower support surface 148a is positioned below the rear upper support surface 158a. In addition, the width of the distal end 136 of the biasing member 132 illustrated in FIG. 6 in the left-right direction is narrower than the gap between the pair of left and right rear lower protrusions 148 so as to allow passage between the pair of left and right rear lower protrusions 148 forming the rear lower support surface 148a.

The biasing member 132 engages the lower surface 169b3 of the rear end of the operation handle 133 from below at a position (intermediate position) between the front upper support surface 157a and the rear upper support surface 158a, and biases the operation handle 133 upward. Thus, the upper surface 169b1 of the operation handle 133 comes into contact with the pair of upper support surfaces (the front upper support surface 157a and the rear upper support surface 158a). At this time, a clearance C1 is provided in the up-down direction between the front lower support surface 147c provided in the lock release lever 131 and the lower surface 169b3 of the rear end of the operation handle 133, and a clearance C2 is provided in the up-down direction between the rear lower support surface 148a provided in the upper rail 105 and the lower surface 169b3 of the rear end of the operation handle 133.

Next, the operation of the seat sliding device 101 configured as described above will be described.

FIG. 11 illustrates a standby state (a non-operation state in which the operation handle 133 is not operated) in which the lock teeth 125b of the lock member 117 are engaged with the lock grooves 127 of the lower rail 103 and locked thereto. In this state, the operation handle 133 is pressed against the pair of upper support surfaces (the front upper support surface 157a and the rear upper support surface 158a) by the pressing protrusion 145 of the biasing member 132. Since the pressing force (biasing force) of the biasing member 132 is larger than the force of the operation handle 133 going down by its own weight, and smaller than the three of biasing the lock member 117 in the lock direction, the above standby state is maintained.

Figure 12:
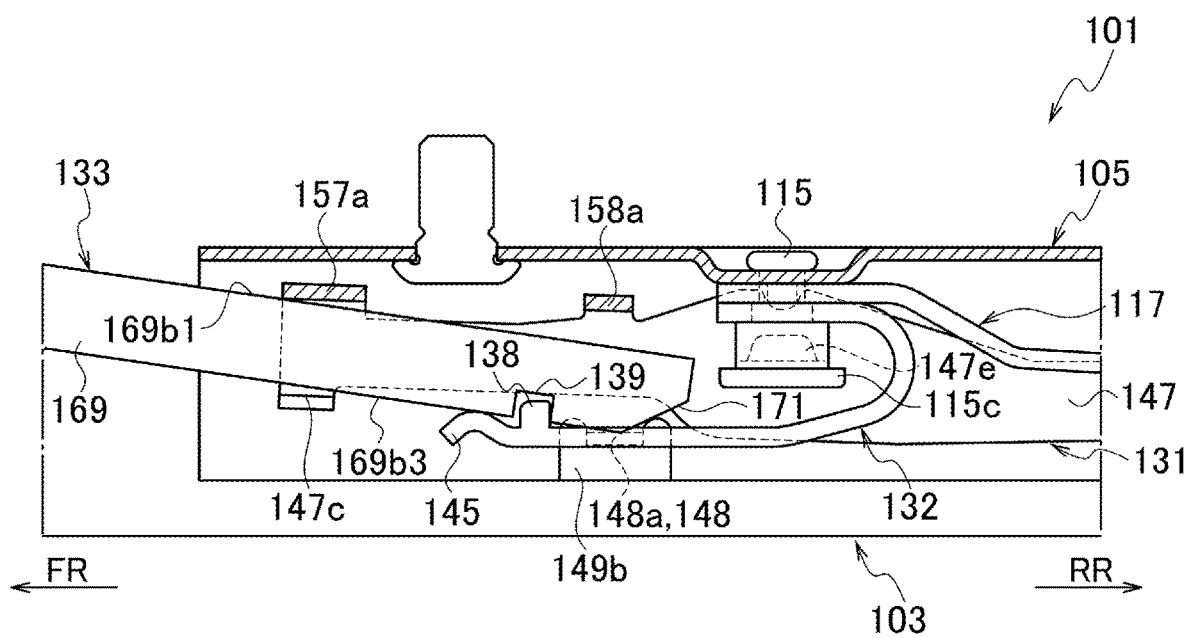
FIG. 12 is a side-sectional view of an enlarged main portion of the seat sliding device illustrating a state in which the operation handle operates in a lock release direction.

From the state illustrated in FIG. 11, when an occupant lifts the grip 168 of the operation handle 133, the operation handle 133 turns around the contact point between the front upper support surface 157a and the upper surface 169b1 of the operation handle 133 as a fulcrum, and the rear end of the operation handle 133 moves downward by pushing down the pressing protrusion 145 of the biasing member 132. In this state, when the grip 168 of the operation handle 133 is further lifted, the lower surface 169b3 of the rear end of the operation handle 133 comes into contact with the rear lower support surface 148a provided in the upper rail 105, and the operation handle 133 turns around the contact point between the rear lower support surface 148a and the lower surface 169b3 of the rear end of the operation handle 133 as a fulcrum. As a result, the upper surface 169b1 of the operation handle 133 turns and lifts the front upper support surface 157a of the lock release lever 131 upward, and the lock release lever 131 turns the lock portion of the lock member 117 in the lock release direction (see FIG. 12).

As a result, the lock release lever 131 swings and rotates clockwise in FIG. 11 around the swing fulcrum portion 151. At this time, due to the swinging rotation of the lock release lever 131, the curved protrusion 153a of the rear release pressing portion 153 pushes the rear end 125 corresponding to the periphery of the lock portion of the lock member 117 downward, and the rear elastic deformation portion 123 elastically deforms downward. That is, the release pressing portion 153 can press the periphery of the lock teeth 125b of the lock member 117. As a result, the lock teeth 125b come away from the lock grooves 127 of the lower rail 103, and thus the lock is released. When the lock is released, it is possible to move the seat (not illustrated) back and forth with respect to the floor surface of the vehicle of the lower rail 103 side together with the upper rail 105, and secure the seat position desired by an occupant.

When the occupant releases his or her hand from the operation handle 133 in a state where the seat position is determined, the rear elastic deformation portion 123 of the lock member 117 presses the release pressing portion 153 upward, and the lock release lever 131 swings and rotates to return to the standby state illustrated in FIG. 11. At this time, the lock release lever 131 swings and rotates counterclockwise in FIG. 11 around the swing fulcrum portion 151.

Figure 13:
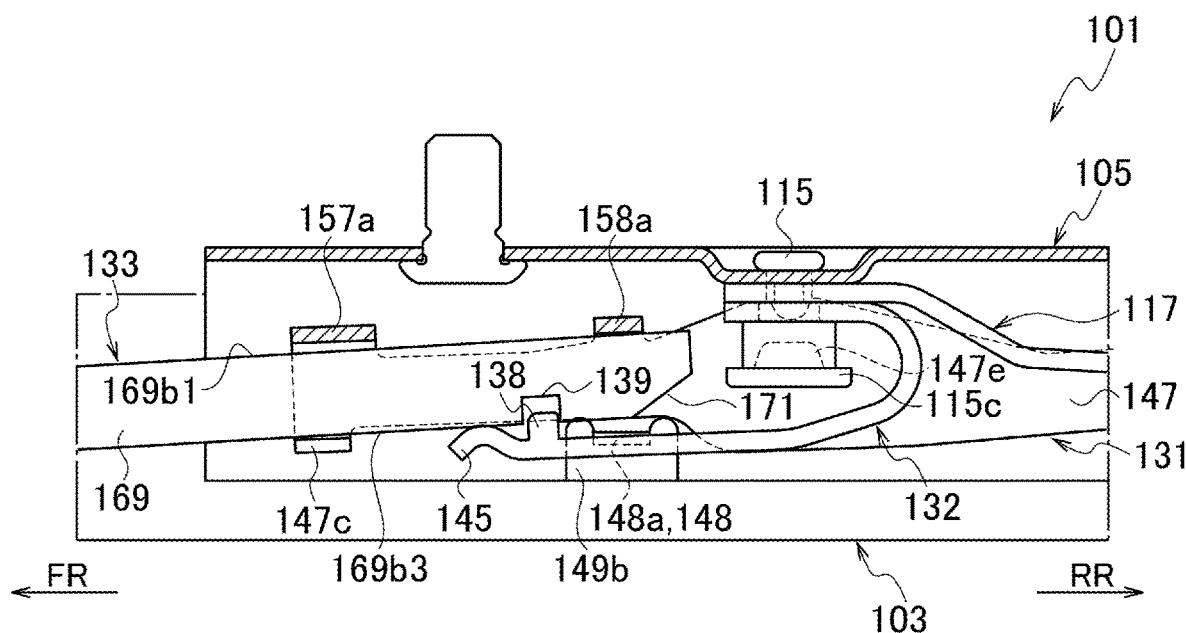
FIG. 13 is a side-sectional view of an enlarged main portion of the seat sliding device illustrating a state in which a load is applied to the operation handle in an anti-lock release direction.

In the state illustrated in FIG. 11, when a load is applied to the operation handle 133 in the anti-lock release direction (downward), the operation handle 133 turns around the contact point between the rear upper support surface 158a and the upper surface 169b1 of the operation handle 133 as a fulcrum, and the operation handle 133 can move downward by the amount of the clearance C1 between the lower surface 169b3 of the operation handle 133 and the front lower support surface 147c (see FIG. 13). Further, in the present embodiment, the lock release lever 131 can be lowered downward until the support protrusions 147e of the lock release lever 131 contact the flange 115c of the fixing member 115. This makes it possible to reduce the impact in the direction of pushing the operation handle 133 downward. In addition, even when a phase difference is generated between the left and right rail bodies 106 with respect to the operation handle 133 which is a rigid body, it is possible to absorb this phase difference, and this makes it possible to prevent the lock release lever 131 of the one rail body 106 from turning in the lock release direction due to the phase difference.

The functional effect of the seat sliding device 101 according to the present embodiment will be described below.

(1) A seat sliding device 101 includes: a lower rail 103 extending in a vehicle front-rear direction; an upper rail 105 configured to move relative to the lower rail 103 in a longitudinal direction; a lock member 117 attached to the upper rail 105, and including lock portions (lock teeth 125b) configured to engage with locked portions formed in the lower rail 103 and to be biased in a lock direction; a lock release lever 131 turnably supported about an axis in a left-right direction with respect to the upper rail 105, and configured to move the lock portions from a lock position to a lock release position in accordance with a lock release operation; an operation handle 133 connected to a front end of the lock release lever 131; and a biasing member 132 configured to bias the front end of the lock release lever 131 in the lock release direction with a biasing force weaker than a biasing force biasing the lock portions in the lock direction. A front upper support surface 157a and a rear upper support surface 158a facing an upper surface 169b1 of a rear end of the operation handle 133 are provided at the front end of the lock release lever 131 with a gap between the front upper support surface 157a and the rear upper support surface 158a in the vehicle front-rear direction, and front lower support surfaces 147c facing a lower surface 169b3 of a rear end of the operation handle 133 are provided below the front upper support surface 157a. The upper rail 105 is provided with a rear lower support surface 148a facing the lower surface 169b3 of the rear end of the operation handle 133, and the rear lower support surface 148a is positioned below the rear upper support surface 158a. The biasing member 132 has one end fixed to the upper rail 105, and the other end engaged with the lower surface 169b3 of the rear end of the operation handle 133 from below at a position (intermediate position) between the front upper support surface 157a and the rear upper support surface 158a, and biases the operation handle 133 upward. A clearance C1 is provided in the up-down direction between the front lower support surface 147c provided in the lock release lever 131 and the lower surface 169b3 of the rear end of the operation handle 133, and a clearance C2 is provided in the up-down direction between the rear lower support surface 148a provided in the upper rail 105 and the lower surface 169b3 of the rear end of the operation handle 133.

In a standby state (a non-operation state in which the operation handle 133 is not operated), the operation handle 133 is biased upward by the biasing member 132, and pressed against the pair of upper support surfaces (the front upper support surface 157a and the rear upper support surface 158a) disposed in the vehicle front-rear direction. Thus, the front lower support surface 147c provided in the lock release lever 131 and the rear lower support surface 148a provided in the upper rail 105 are disposed below the pair of upper support surfaces, and the lower surface 169b3 of the rear end of the operation handle 133 faces the front lower support surface 147c and the rear lower support surface 148a with the clearances C1 and C2 provided therebetween.

When the operation handle 133 is lifted in the lock release direction (upward) from the standby position of the operation handle 133 in the non-operating state, only the operation handle 133 turns around the contact point between the front upper support surface 157a and the upper surface 169b1 of the rear end of the operation handle 133 as a fulcrum until the lower surface 169b3 of the rear end of the operation handle 133 comes into contact with the rear lower support surface 148a provided in the lower rail 103. When the operation handle 133 is further lifted upward, the operation handle 133 turns around the contact point with the rear lower support surface 148a provided in the upper rail 105 as a fulcrum, and the upper surface 169b1 of the rear end of the operation handle 133 lifts the front upper support surface 157a of the lock release lever 131 upward, and thus the lock release lever 131 turns in the lock release direction.

Meanwhile, when the operation handle 133 is pushed down in the anti-lock release direction (downward) from the standby position of the operation handle 133 in the non-operating state, only the operation handle 133 turns around the contact point between the rear upper support surface 158a and the upper surface 169b1 of the rear end of the operation handle 133 as a fulcrum until the lower surface 169b3 of the rear end of the operation handle 133 comes into contact with the front lower support surface 147c provided in the lock release lever 131.

Accordingly, it is possible to set a range in which only the operation handle 133 can turn relative to the lock release lever 131 in the initial stage of movement in both the lock release direction (upward) and the anti-lock release direction (downward) from the standby position of the operation handle 133 in the non-operation state.

The structure as above can be realized merely by the biasing member 132 for biasing the lock release lever 131 in the lock release direction. This makes the structure simple, and makes it possible to reduce the manufacturing cost.

(2) A fixing member 115 for fixing a plate spring (lock member 117) to a lower surface of the upper rail 105 is provided, and the plate spring is configured to bias the lock portions (lock tooth 125b) in the lock direction. In the biasing member 132, a base 134 is fixed to the lower surface of the upper rail 105 by the fixing member 115 together with the lock member 117, a folded portion 135 of an intermediate portion extends rearward of the vehicle from the base 134 and is folded forward of the vehicle in the middle, and a distal end 136 extends forward of the vehicle by passing below the fixing member 115 to form a substantially U-shape.

The position from one end of the biasing member 132 fixed by the fixing member 115 to the position of the lower surface 169b3 of the rear end of the operation handle 133 can be set with a sufficient length without interfering with the fixing member 115 and the operation handle 133. In addition, even when the length in the front-rear direction from the fixing member 115 to the pushing point (position of the pushing protrusion 145) of the operation handle 133 is short, the biasing member 132 can be easily disposed. This makes it possible to reduce the dimension on the front side from the position of the fixing member 115 in the seat sliding device 101.

(3) A recessed groove 137 extending in the vehicle front-rear direction is provided in the lower surface 169b3 of the rear end of the operation handle 133, and the upper rail 105 is provided with a pair of left and right side walls 147. The rear lower support surface 148a is formed on protrusions (rear lower protrusions 148) protruding from the pair of left and right side walls 147 inwardly in the left-right direction, and a gap is formed between distal ends of the pair of left and right protrusions. The base 134 of the biasing member 132 is provided with a fixing hole (biasing-member-side fixing hole 134a) into which the fixing member 115 is inserted, and a width of the distal end 136 of the biasing member 132 in the left-right direction is formed narrower than the gap between the pair of left and right protrusions.

The distal end 136 of the biasing member 132 can pass vertically between the pair of protrusions (rear lower protrusions 148) forming the rear lower support surface 148a, and can enter the recessed groove 137 provided in the lower surface 169b3 of the rear end of the operation handle 133. For this reason, even if the distal end 136 of the biasing member 132 moves following the movement of the operation handle 133 turning upward, the distal end 136 of the biasing member 132 does not interfere with the rear lower support surface 148a. Accordingly, it is not necessary to form the distal end 136 of the biasing member 132 so as to escape from the rear lower support surface 148a to a large extent, and this makes it possible to dispose the biasing member 132 in a compact manner.

Further, although the distal end 136 of the biasing member 132 is configured to pass below the lower portion of the fixing member 115, the distal end 136 of the biasing member 132 is sufficiently narrow in the left-right direction. Accordingly, in a case where the fixing member 115 is fixed to the upper rail 105, the fixing member 115 can be staked by using a jig for pressing the lower surface of the fixing member 115.

(4) A slit 139 is provided in the lower surface 169b3 of the rear end of the operation handle 133, and a lock protrusion 138 engaging with the slit 139 is provided at the distal end 136 of the biasing member 132. The lock protrusion 138 is formed so as to protrude upward of the pressing protrusion 145, which is provided at the distal end 136 of the biasing member 132 and presses the lower surface 169b3 of the rear end of the operation handle 133.

When the lock protrusion 138 is engaged with the slit 139, it becomes possible to prevent the operation handle 133 from coming off in the axial direction.

Further, when the rear end of the operation handle 133 is inserted into the front end of the lock release lever 131, the rear end of the operation handle 133 is inserted into the front end of the lock release lever 131 by pushing the distal end 136 of the biasing member 132 downward. Since the lock protrusion 138 protrudes upward of the pressing protrusion 145, the pressing protrusion 145 is not engaged with the slit 139, and this makes it possible to prevent erroneous assembly of the operation handle 133.

Second Embodiment

Figure 14:
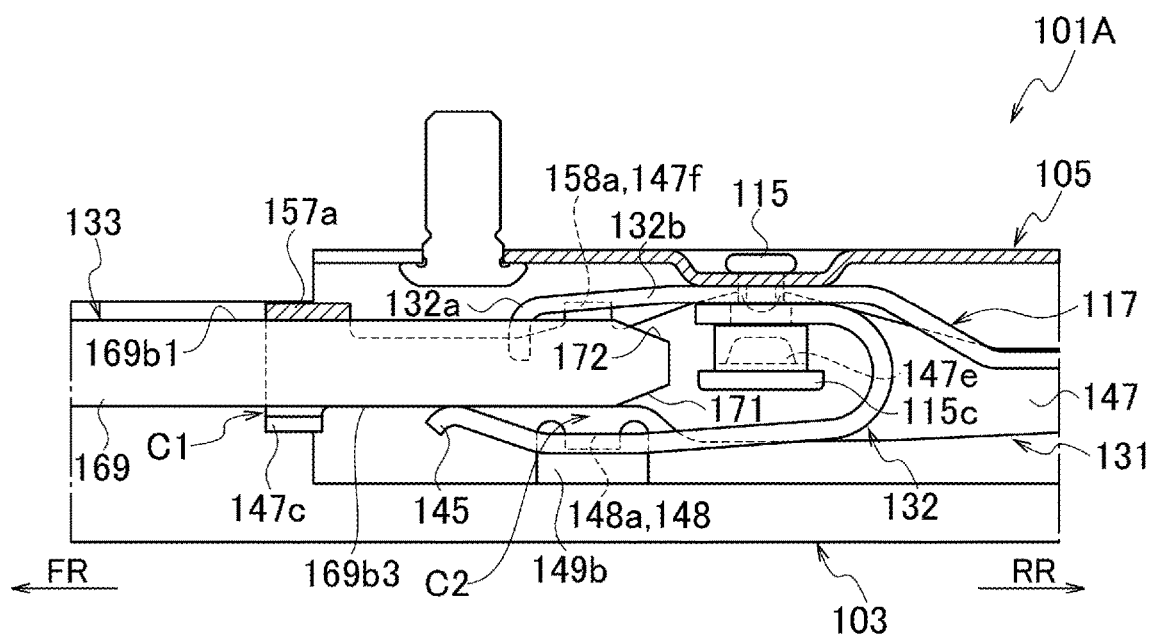
FIG. 14 is a side-sectional view of a seat sliding device according to a second embodiment, which corresponds to FIG. 11.
Figure 15:
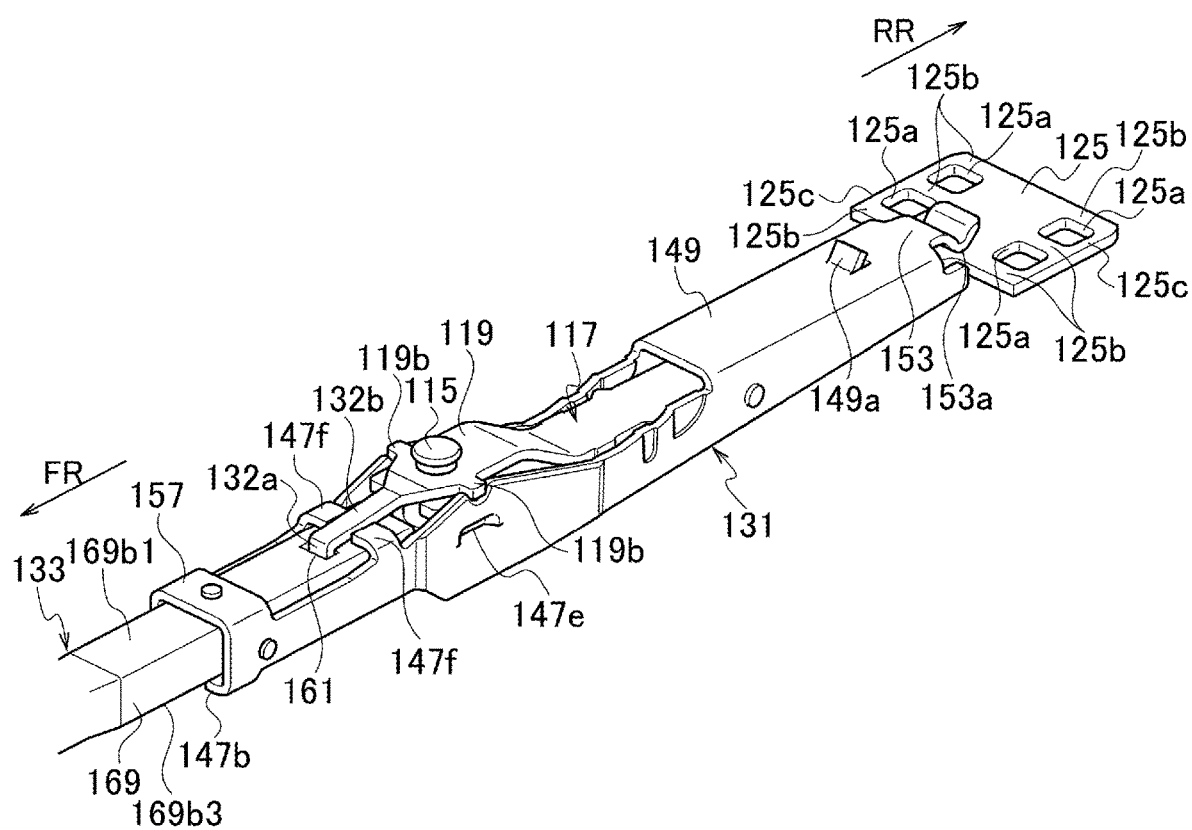
FIG. 15 is a perspective view of the seat sliding device according to the second embodiment, which corresponds to FIG. 10.

FIG. 14 is a side-sectional view of a seat sliding device according to a second embodiment, which corresponds to FIG. 11. FIG. 15 is a perspective view of the seat sliding device according to the second embodiment, which corresponds to FIG. 10.

The difference from the first embodiment will be described below.

In a seat sliding device 101A, a lock claw 132a, which is configured to prevent the operation handle 133 from coming off in the axial direction, is provided in a plate spring (lock member 117). The lock claw 132a engaging with a lock hole 161 is formed at the distal end of a front extension portion 132b extending forward from the fixing portion 119 of the lock member 117. The lock hole 161 is provided on the upper surface 169b1 of the rear end of the operation handle 133. An upper tapered surface 172 is provided so as to avoid the lock claw 132a when the operation handle 133 is inserted into the lock release lever 131. The lock claw 132a is formed downward.

Rear upper protrusions 147f are formed at the upper portions of the left and right side walls 147 of the lock release lever 131, and the rear upper protrusions 147f protrude from the both side walls 147 so as to be bent toward the sides facing each other. The distal ends of the left and right rear upper protrusions 147f are separated from each other, and a gap is formed there between. The lower surfaces of the rear lower protrusions 147f form a rear upper support surface 158a. That is, the lock release lever 131 is provided with the rear upper support surface 158a facing the lower surface 169b3 of the rear end of the operation handle 133, and the rear upper support surface 158a is positioned above the rear lower support surface 148a. In addition, the width of the front extension portion 132b of the lock member 117 in the left-right direction is narrower than the gap between the pair of left and right rear upper protrusions 147f so as to allow passage between the pair of left and right rear upper protrusions 147f forming the rear upper support surface 158a.

In the second embodiment, the upper surface 169b1 of the rear end of the operation handle 133 is provided with the lock hole 161. The lock member 117 includes: a biasing portion (the front extension portion 132b) extending from a fixed position with respect to the upper rail 105 toward the vehicle front side; and the lock claw 132a provided at the distal end of the front extension portion 132b and engaged with the lock hole 161. The rear upper support surfaces 158a of the lock release lever 131 are provided with a gap between the rear upper support surfaces 158a in the left-right direction, and the width of the front extension portion 132b in the left-right direction is formed narrower than the gap between the pair of left and right rear upper support surfaces 158a.

When the lock claw 132a is engaged with the lock hole 161, it becomes possible to prevent the operation handle 133 from coming off in the axial direction.

Further, when the lock release lever 131 turns in the lock release direction, the lock claw 132a and the front extension portion 132b do not interfere with the rear upper support surface 158a of the lock release lever 131. Accordingly, it is not necessary to form the lock claw 132a so as to escape from the upper rear support surface 158a of the lock release lever 131, and this makes it possible to dispose the lock member 117 including the lock claw 132a and the front extension portion 132b in a compact manner.

Third Embodiment

Figure 16:
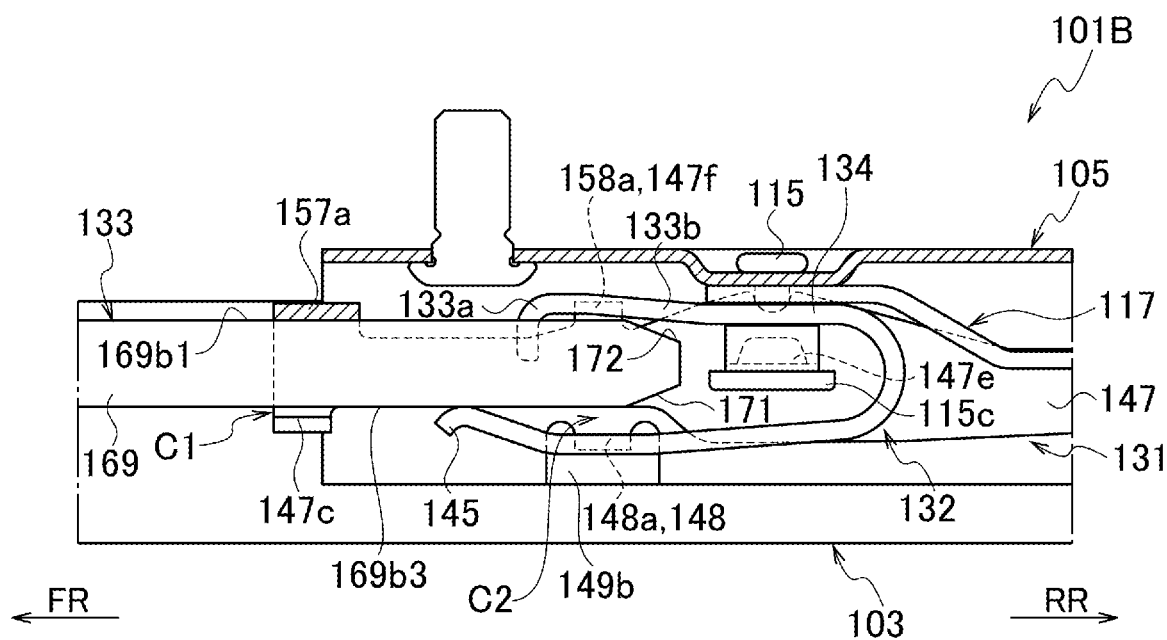
FIG. 16 is a side-sectional view of a seat sliding device according to a third embodiment, which corresponds to FIG. 11.
Figure 17:
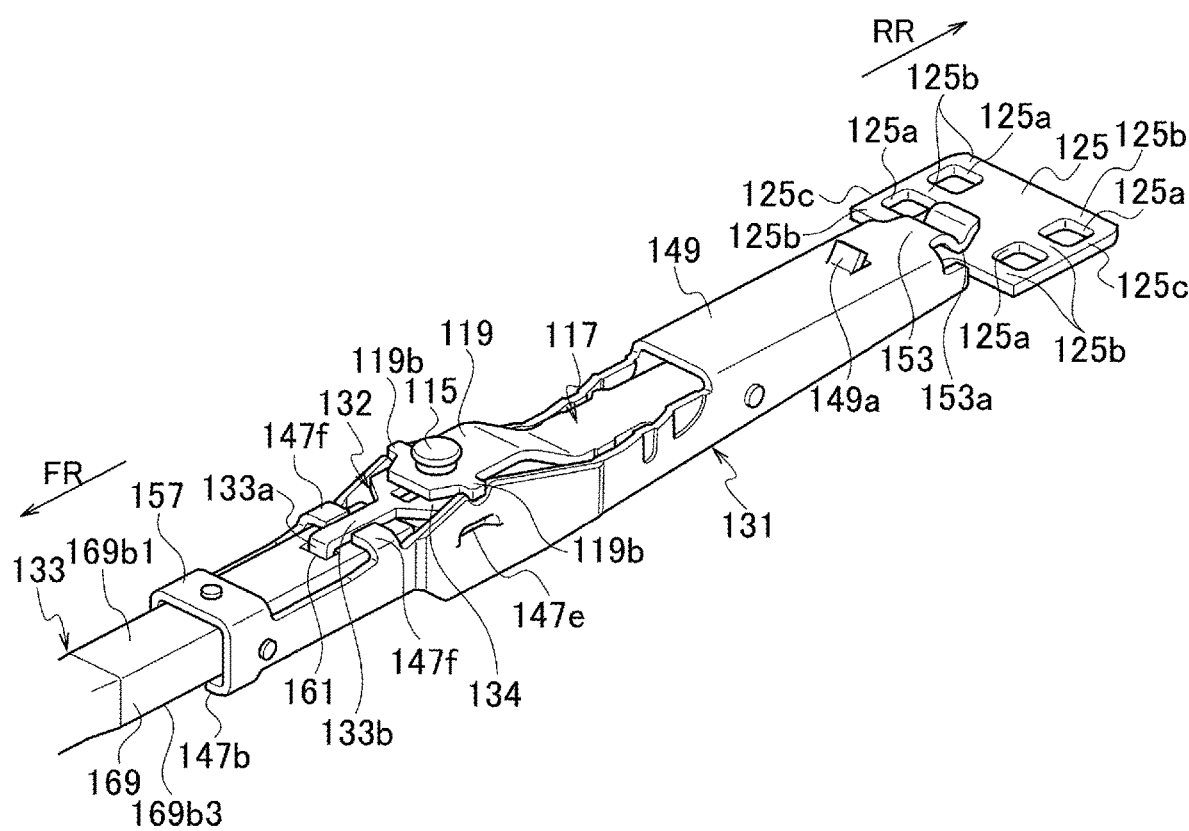
FIG. 17 is a perspective view of the seat sliding device according to the third embodiment, which corresponds to FIG. 10.

FIG. 16 is a side-sectional view of a seat sliding device according to a third embodiment, which corresponds to FIG. 11. FIG. 17 is a perspective view of the seat sliding device according to the third embodiment, which corresponds to FIG. 10.

The difference from the first embodiment will be described below.

In a seat sliding device 101B, a lock claw 133a, which is configured to prevent the operation handle 133 from coming off in the axial direction, is provided in the base 134 of the biasing member 132. The lock claw 133a engaging with the lock hole 161 is formed at the distal end of a front extension portion 133b extending forward from the base 134 of the biasing member 132. The lock hole 161 is provided on the upper surface 169b1 of the rear end of the operation handle 133. The upper tapered surface 172 is provided so as to avoid the lock claw 133a when the operation handle 133 is inserted into the lock release lever 131. The lock claw 133a is formed downward.

The rear upper protrusions 147f are formed at the upper portions of the left and right side walls 147 of the lock release lever 131, and the rear upper protrusions 147f protrude from the both side walls 147 so as to be bent toward the sides facing each other. The distal ends of the left and right rear upper protrusions 147f are separated from each other, and a gap is formed therebetween. The lower surfaces of the rear upper protrusions 147f form a rear upper support surface 158a. That is, the lock release lever 131 is provided with the rear upper support surface 158a facing the lower surface 169b3 of the rear end of the operation handle 133, and the rear upper support surface 158a is positioned above the rear lower support surface 148a. In addition, the width of the front extension portion 133b of the biasing member 132 in the left-right direction is narrower than the gap between the pair of left and right rear upper protrusions 147f so as to allow passage between the pair of left and right rear upper protrusions 1471 forming the rear upper support surface 158a.

In the third embodiment, the upper surface 169b1 of the rear end of the operation handle 133 is provided with the lock hole 161. The biasing member 132 includes: a biasing portion (the front extension portion 133b) extending from a fixed position with respect to the upper rail 105 toward the vehicle front side; and the lock claw 133a provided at the distal end of the front extension portion 133b and engaged with the lock hole 161. The rear upper support surfaces 158a of the lock release lever 131 are provided with a gap between the rear upper support surfaces 158a in the left-right direction, and the width of the front extension portion 133b in the left-right direction is formed narrower than the gap between the pair of left and right rear upper support surfaces 158a.

When the lock claw 133a is engaged with the lock hole 161, it becomes possible to prevent the operation handle 133 from coming off in the axial direction.

Further, when the lock release lever 131 turns in the lock release direction, the lock claw 133a and the front extension portion 133b do not interfere with the rear upper support surface 158a of the lock release lever 131. Accordingly, it is not necessary to form the lock claw 133a so as to escape from the upper rear support surface 158a of the lock release lever 131, and this makes it possible to dispose the biasing member 132 including the lock claw 133a and the front extension portion 133b in a compact manner.

Although the embodiments of the present invention have been described above, these embodiments are merely illustrative in order to facilitate understanding of the present invention, and the present invention is not limited to these embodiments. The technical scope of the present invention is not limited to the specific technical matters disclosed in the above embodiments, but also includes various modifications, changes, alternative techniques and the like which can be readily derived therefrom.

What is claimed is:

1. A seat sliding device comprising:
a lower rail extending in a vehicle front-rear direction;
an upper rail configured to move relative to the lower rail in a longitudinal direction;
a lock member attached to the upper rail, and including lock portions configured to engage with locked portions formed in the lower rail and to be biased in a lock direction;
a lock release lever turnably supported about an axis in a left-right direction with respect to the upper rail, and configured to move the lock portions from a lock position to a lock release position in accordance with a lock release operation;
an operation handle connected to a front end of the lock release lever; and
a biasing member configured to bias the front end of the lock release lever in the lock release direction with a biasing three weaker than a biasing force biasing the lock portions in the lock direction, wherein
a front upper support surface and a rear upper support surface facing an upper surface of an end of the operation handle are provided at the front end of the lock release lever with a gap between the front upper support surface and the rear upper support surface in the vehicle front-rear direction, and front lower support surfaces facing a lower surface of an end of the operation handle are provided below the front upper support surface,
the upper rail is provided with a rear lower support surface facing the lower surface of the end of the operation handle, and the rear lower support surface is positioned below the rear upper support surface,
the biasing member has one end fixed to the upper rail, and another end engaged with the lower surface of the end of the operation handle from below at a position between the front upper support surface and the rear upper support surface, and biases the operation handle upward, and
a clearance is provided in an up-down direction between the front lower support surfaces provided in the lock release lever and the lower surface of the end of the operation handle, and a clearance is provided in the up-down direction between the rear lower support surface provided in the upper rail and the lower surface of the end of the operation handle.

2. The seat sliding device according to claim 1, wherein a fixing member for fixing a plate spring to a lower surface of the upper rail is provided, the plate spring being configured to bias the lock portions in the lock direction, and
in the biasing member, a base is fixed to the lower surface of the upper rail by the fixing member together with the lock member, a folded portion of an intermediate portion extends rearward of the vehicle from the base and is folded forward of the vehicle in a middle, and a distal end extends forward of the vehicle by passing below the fixing member to form a substantially U-shape.

3. The seat sliding device according to claim 2, wherein a recessed groove extending in the vehicle front-rear direction is provided in a lower surface of a rear end of the operation handle,
the upper rail is provided with a pair of left and right side walls,
the rear lower support surface is formed on protrusions protruding from the pair of left and right side walls inwardly in the left-right direction, and a gap is formed between distal ends of the pair of left and right protrusions, and
the base of the biasing member is provided with a fixing hole into which the fixing member is inserted, and a width of the distal end of the biasing member in the left-right direction is formed narrower than the gap between the pair of left and right protrusions.

4. The seat sliding device according to claim 1, wherein a slit is provided in the lower surface of the end of the operation handle,
a lock protrusion engaging with the slit is provided at an other end of the biasing member, and
the lock protrusion is formed so as to protrude upward of a pressing protrusion, which is provided at the other end of the biasing member and presses the lower surface of the rear end of the operation handle.

5. The seat sliding device according to claim 1, wherein the upper surface of the end of the operation handle is provided with a lock hole,
the lock member or the biasing member includes a biasing portion extending from a fixed position with respect to the upper rail toward a vehicle front side, and a lock claw provided at a distal end of the biasing portion and engaged with the lock hole,
the rear upper support surfaces of the lock release lever are provided with a gap between the rear upper support surfaces in the left-right direction, and
a width of the biasing portion in the left-right direction is formed narrower than a distance between the pair of left and right rear upper support surfaces.

* * * * *